W. B. FLANDERS.
BALANCING MACHINE.
APPLICATION FILED OCT. 20, 1919.
1,437,798.
Patented Dec. 5, 1922.
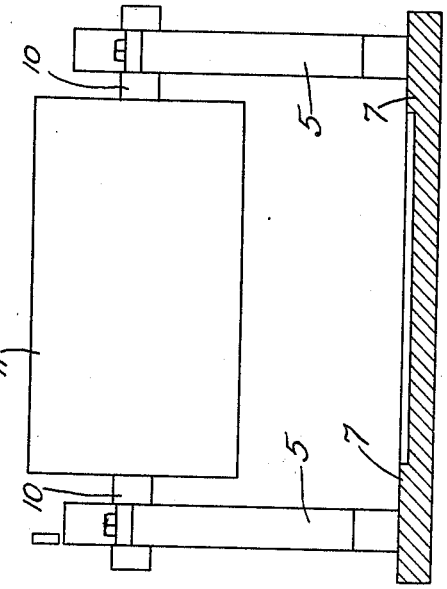
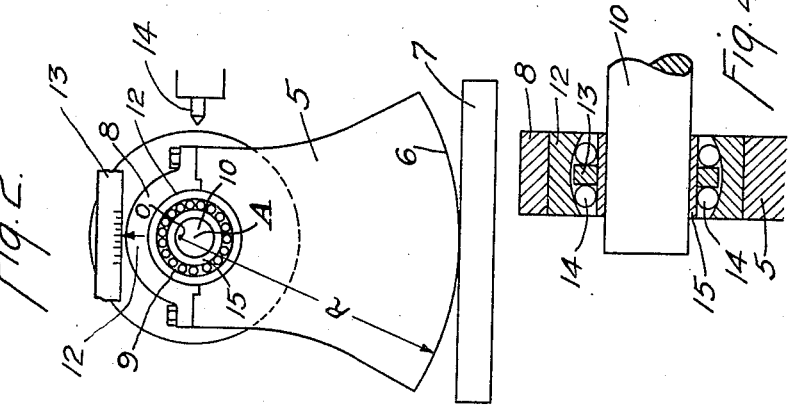
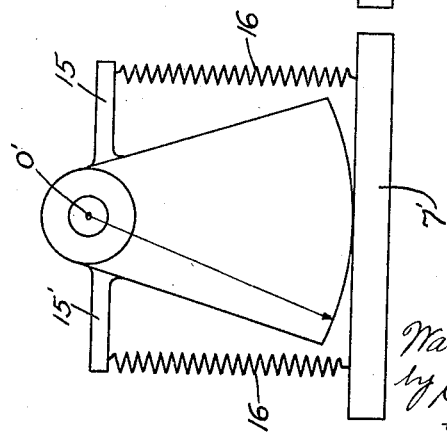
INVENTOR.
Warren B. Flanders
by B. McCalister
his ATTORNEY Patented Dec. 5, 1922.

1,437,798

UNITED STATES PATENT OFFICE.

WARREN B. FLANDERS, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed October 20, 1919. Serial No. 331,849.

*To all whom it may concern:*

Be it known that I, WARREN B. FLANDERS, a citizen of the United States, and a resident of Wilkinsburg, in the county of Allegheny and State of Pennsylvania, have made a new and useful Invention in Balancing Machines, of which the following is a specification.

This invention relates to balancing machines and particularly to that class of apparatus used in balancing the rotor elements of large turbines, electric motors and generator units, and has for an object to produce a balancing machine that is of simple and inexpensive construction with which the location and mass of the heavy spots in a rotor may be quickly and accurately determined.

A further object is to produce a simple balancing machine with which the heavy spots of a rotor in static balance but not in dynamic balance may be located with sufficient accuracy to correct the weight distribution of the rotor and dynamically balance the same.

A further object is to produce a balancing machine which is sensitive to slight unbalanced mass of the rotor, and with which slight inaccuracies of balance may be determined so that the proper corrections may be accurately made.

The rotor of large turbines, motors and generators and especially the rotors of steam turbines rotate at comparatively high velocity and for this reason it is essential that the rotors be in true static and dynamic balance. Various types of machines are used for detecting unbalanced condition of rotors, some of which are expensive and complicated. The present invention contemplates a construction which is extremely simple and which may be easily operated. Certain embodiments of the invention are illustrated in the accompanying drawings wherein—

Fig. 1 is a side elevation of the balancing machine showing a rotor mounted therein.

Fig. 2 is an end elevation of the machine shown in Fig. 1.

Fig. 3 is a diagrammatic end elevation of a modified form of balancing machine.

Fig. 4 is a vertical section through the anti-friction bearing illustrated in Fig. 2.

Referring to the drawings; the apparatus includes a pair of similar supporting pedestals or cradles 5, each provided with a curved or arcuate bottom 6, adapted to rock upon the level ways 7. The upper part of the cradle is provided with a bearing cap 8, which fits over and retains a suitable anti-friction radial ball bearing 9, in which the shaft 10 of the rotor 11 may move both longitudinally and angularly within certain limits.

This bearing is illustrated in section in Fig. 4 and includes an annular ball race 12 provided with a concave inner surface which is part of a sphere having its center on the axis of the bearing and midway between the end faces of the ball race. Within this ball race is mounted a cage 13 which carries two parallel rows of balls 14, see Fig. 4, so spaced that their point of contact with the concave surface lies in the surface of a sphere having the same radius as the curvature of the ball race. The balls are retained by the cylindrical sleeve 15, which is adapted to receive the shaft of the rotor. It is apparent that the shaft 10 is free to slide longitudinally in the sleeve 15 and by reason of the spherical surface of the ball race, the shaft is also free to move into angular relation with respect to the true axis of the ball race. The bearing therefore permits of universal movement of the shaft of the rotor with respect to the cradle. The cradles are mounted upon the ways 7, so that they may be oscillated in a direction normal to the true axis of the ball race.

As shown in Fig. 2, the curve of the bottom 6 of the cradle is an arc of a circle having the radius R and center O. The axis A of the shaft 10 is preferably disposed between the center of curvature and the curved bottom 6 and a slight distance beneath the center O. Therefore the rotor is supported in stable equilibrium above the curved surface and may be moved laterally and oscillated as though it were a pendulum having a long period of oscillation. For the purpose of this invention, the axis A might be coincident with the center O, as in the cradle illustrated in Fig. 3, so that the rotor is supported in equilibrium and would therefore oscillate in a horizontal plane instead of in the path of an arc.

The heavy spot in a rotor causing static unbalance may be detected by mounting the rotor in the cradle so that it is free to be rotated in the anti-friction bearings thereon. The heavy spot of the rotor will gradually gravitate to the underside of the rotor. This action may be facilitated by oscillating the rotor through the medium of any preferred agency, such as a friction drive. After the axial plane of unbalance has been determined, corrections may be made to balance the rotor statically. Such corrections may not establish dynamic balance, and the heavy spots causing this defect may be detected by rotating the body at a moderate speed. If the rotor is not in dynamic balance, the heavy spots, which are the cause of this condition, will exert centrifugal force, tending to pull the rotor in the direction of a radial line traversing the spot. This force will cause the cradles to oscillate and the degree of oscillation will to some extent correspond to the magnitude of force tending to throw the rotor off center.

If the rotor is in static balance and is unbalanced dynamically there will be two spots tending to oscillate the rotor. The couple established by these spots will oscillate the cradles, causing them to be simultaneously moved in opposite directions and possibly through unequal distances, depending on the location and mass of the unbalanced portions. The degree of oscillation is indicated as shown by a pointer 12 carried by each cradle on a perpendicular radial line of the center O. The pointer cooperates with a stationary dial 13 supported independently of the cradles and having graduations thereon indicating the degree of displacement of the rotor. A pointer and dial are provided for each cradle and the observations of the degree of oscillation are taken simultaneously. By comparing the results of the observations the degree of dynamic unbalance may be determined and the axis about which the unbalanced couple tends to revolve may be calculated. The axial plane of the heavy spots may be determined by markers 14, one of which is shown, which are moved into scoring contact with the cylindrical surface of the rotor adjacent the ends thereof. These markers will score or mark the rotor and indicate the axial planes in which the heavy spots are located. From the foregoing observations as to the degree of oscillation of the rotor and the axial plane of unbalance, the heavy spots may be located and analyzed so that the rotor may be corrected with a minimum of manipulation.

In Fig. 3, I have shown a modified form of balancing machine wherein the cradle is similar in all respects to the cradle previously described, with the exception that the axis of the rotor is coincident with the center of curvature of the rocking surface of the cradle and that for this reason, means are provided for the purpose of dampening the oscillations caused by rotation of the rotor under certain conditions. In this construction the cradles 5' are provided with longitudinally extending wings 15' to which helical tension springs 16 are attached. The lower ends of the springs 16 which are all of equal tension are secured to the ways 7' and tend to dampen the oscillatory movement of the cradle. The operation of detecting the heavy spots of the rotor is similar to that previously described.

While I have described and illustrated but two embodiments of my invention, it will be apparent to those skilled in the art that various changes, modifications, additions and omissions may be made in the apparatus described and illustrated without departing from the spirit and scope of the invention as set forth by the appended claims.

What I claim is:

1. A machine for balancing rotating bodies, comprising a substantially level way, a cradle having an arcuate rocking surface mounted on the way, and bearing means on the cradle for rotatably supporting the body whereby the axis of rotation of the body lies between the center of curvature of the rocking surface and the said way.

2. A machine for balancing rotating bodies comprising a way having a plane surface, a cradle having an arcuate rocking surface mounted on the way, and a shaft bearing carried by the cradle for rotatably supporting the shaft of the body, whereby the body is supported in equilibrium above the rocking surface.

3. A machine for balancing rotating bodies comprising a substantially level way, a cradle having an arcuate rocking surface mounted on the way, and bearing means on the cradle for rotatably supporting the body whereby the body is supported in stable equilibrium above the rocking surface, the said cradle being adapted to rock on the way and thereby permit lateral displacement of the axis of rotation of the body.

4. A machine for balancing rotating bodies comprising a substantially level way, a pair of cradles spaced apart and each having an arcuate rocking surface mounted on the way and bearing means on the cradles adapted to rotatably support the body between the cradles in equilibrium above the rocking surface, the said cradles being adapted to rock on the way and thereby permit lateral displacement of the axis of rotation of the body.

5. A machine for balancing rotary bodies comprising a substantially level way, a pair of cradles spaced apart and each having an arcuate rocking surface mounted on the way, and a bearing means on the cradles adapted to rotatably support the body between the cradles for angular and longitudinal movement of the body with respect to the cradles.

6. A machine for balancing rotating bodies comprising a substantially level way, a pair of independently operable cradles spaced apart and each having an arcuate rocking surface mounted on the way, and bearing means on the cradles adapted to rotatably support the body with its axis normal to the direction of oscillation of the cradles, and adapted to permit of lateral and angular displacement of the axis of the body with respect to the cradle.

7. A machine for balancing rotating bodies comprising a substantially level way, a cradle having an arcuate rocking surface mounted for oscillation on the way, and a bearing means on the cradle having its center below the center of curvature of the arcuate rocking surface for rotatably supporting the body in stable equilibrium above the way.

8. In combination in a balancing machine, two independently movable supports on which the body to be balanced is rotatively mounted having lower rocking supporting surfaces, and means for indicating the movement of each support in response to an unbalanced condition of the rotating body.

In testimony whereof, I have hereunto subscribed my name this 11th day of October, 1919.

WARREN B. FLANDERS.